Patented July 11, 1933

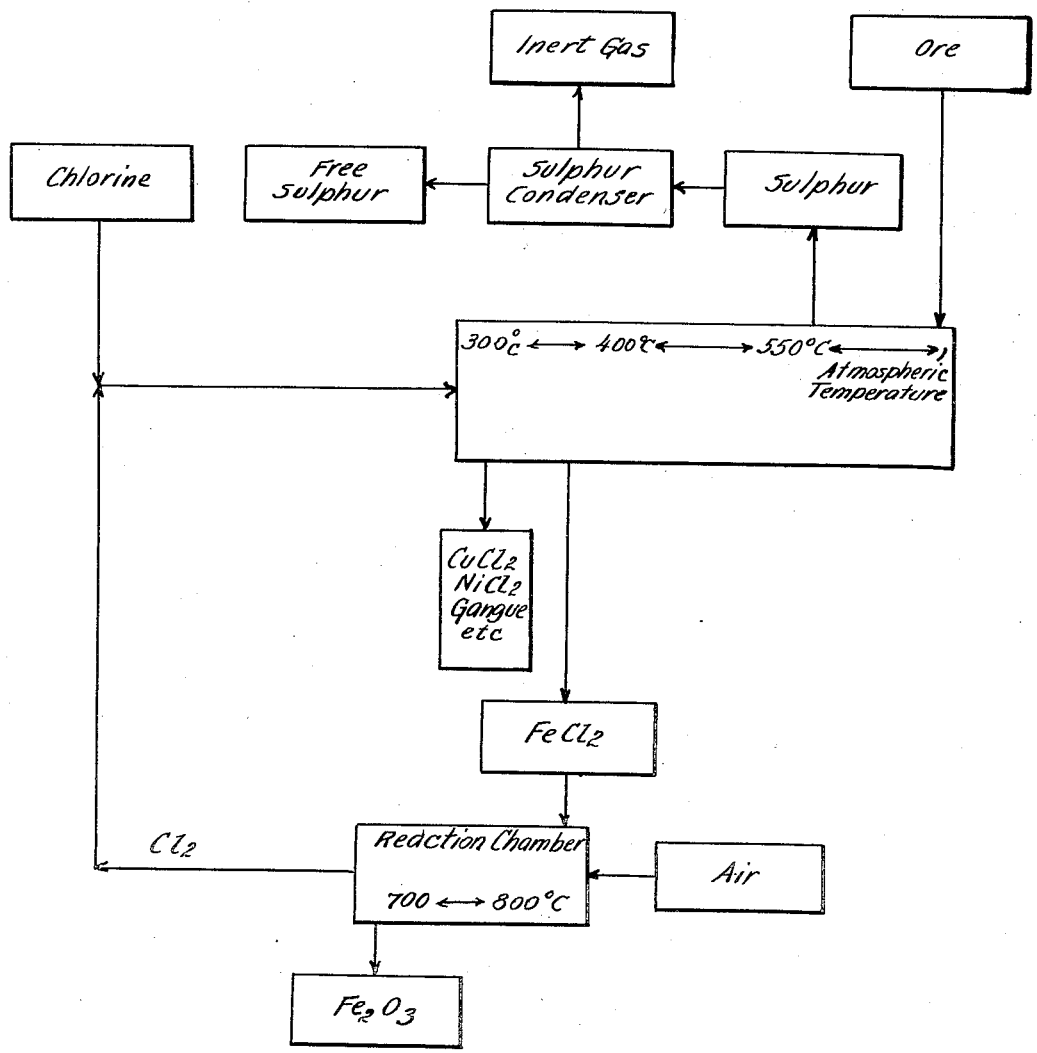

1,917,222

UNITED STATES PATENT OFFICE

RAYMOND F. BACON, OF BRONXVILLE, AND HENRY T. HOTCHKISS, JR., OF NEW ROCHELLE, NEW YORK; SAID HOTCHKISS, JR., ASSIGNOR TO SAID BACON

TREATMENT OF IRON SULPHIDE-BEARING MATERIAL

Application filed February 25, 1930. Serial No. 431,134.

This invention relates to the recovery of sulphur and has for an object the provision of an improved process for recovering sulphur from heavy metal sulphide ores. More particularly, the invention contemplates the provision of an improved process for recovering sulphur from materials containing one or more sulphides of iron. The invention further contemplates the provision of an improved process for treating heavy metal sulphide ores such, for example, as ore containing sulphides of iron, copper and nickel.

The process of the present invention involves the treatment of ore or other metallurgical raw materials or products containing pyrites or other sulphides of iron, alone or in combination with sulphides of other heavy metals, such for example, as copper and nickel, with a reagent such as chlorine, sulphuryl chloride or sulphur chloride for the purpose of obtaining free sulphur and/or separating iron from the mass of material undergoing treatment.

In carrying out a process in accordance with the present invention, a quantity of the material to be treated is subjected to the action of a chlorinating agent under such conditions that free sulphur and ferric chloride are produced and vaporized. The vaporized sulphur is collected and the ferric chloride is utilized for treating additional quantities of sulphide-bearing material to produce a product in which ferrous chloride is concentrated. The ferrous chloride concentrate is appropriately treated to recover chlorine which is returned to the process.

The process may be conveniently conducted by passing the sulphide-bearing material progressively through reaction zones of different temperatures. According to the preferred process of the invention, the iron sulphide-bearing material is first introduced into a reaction zone of relatively high temperature and passed progressively through reaction zones of lower temperatures. The process is so controlled that ferrous chloride is produced in the high temperature reaction zones and ferric chloride is produced in the lower temperature reaction zones. Elemental sulphur is produced and vaporized and the ferric chloride produced is vaporized. The vaporized sulphur and ferric chloride are caused to pass over fresh or partially converted sulphide-bearing material in the higher temperature reaction zones, the sulphur vapor ultimately being collected as free sulphur, and the ferric chloride reacting with sulphide compounds and being reduced to ferrous chloride.

The process may be carried out in any suitable type of apparatus, but it is preferably carried out in a rotary reaction chamber in which a suitable temperature gradient is maintained and into which the chlorinating reagent and iron sulphide-bearing material are introduced at appropriate points.

The invention will be better understood from a consideration of the accompanying flowsheet and the following description of a process involving the treatment of ore containing sulphides of iron, copper, and nickel with chlorine.

The ore to be treated is introduced in a dry, finely divided condition into the interior of a rotary reaction chamber having charging means at one end and discharging means at the other end. An opening or passage to permit the outward passage of sulphur vapors and other gases is provided near the charging end. The temperature within the reaction chamber is so regulated that it gradually increases from the normal atmospheric temperature at the charging end to a maximum temperature of about 550° C. at a point about midway between the two ends, and gradually decreases from the region of maximum temperature to about 300° C. at the discharge end. The opening or passage for sulphur vapors is preferably located at a point between the charging end of the chamber and the region of maximum temperature where the temperature within the chamber is about 450° C. or slightly lower.

The ore, preferably ground to provide particles sufficiently small to pass a 100-mesh screen in order that intimate contact of the chlorine with the sulphide compounds may be obtained, is introduced into the reaction chamber at the charging end. Chlorine is introduced into the reaction chamber at the discharge end.

The process is conducted as a batch process, the discharge end of the chamber being closed. The ore may be fed to the chamber continuously until the desired concentration has been effected, or the ore may be fed to the reaction chamber until a predetermined amount has been introduced.

When ore is first introduced into the reaction chamber, no chlorine is introduced until the ore reaches or passes the zone of maximum temperature. As the ore reaches the zone of maximum temperature, the chlorine may be admitted, slowly at first, and in gradually increasing amounts as the ore and chlorinated material progress through the chamber. Chlorine may be admitted at any desired maximum rate. The rate at which chlorine is admitted and the amount of chlorine admitted will be determined by the rate of feeding of ore into the reaction zones and the amount of ore to be treated.

During the course of the process, the chlorine first reacts with the sulphides of iron, copper and nickel to produce free sulphur, ferrous chloride and the chlorides of copper and nickel. The free sulphur is vaporized and passes out of the reaction chamber to suitable collecting and condensing apparatus. As the reaction chamber is rotated, the ferrous chloride-bearing material moves gradually toward the discharge end and fresh ore is moved into the zone of maximum temperature. As the ferrous chloride-bearing material moves toward the discharge end the chlorine reacts with the ferrous chloride and oxidizes it to ferric chloride. The ferric chloride produced is vaporized and the resulting vapor is swept along with the chlorine toward the zone of maximum temperature. The ferric chloride comes into contact with fresh or partially chlorinated sulphide-bearing material and is reduced to ferrous chloride.

The process is so conducted and controlled that iron compounds are substantially completely eliminated from the material in the discharge end portion of the reaction chamber and ferrous chloride is concentrated in the adjoining portion of the reaction chamber. The material in the discharge end portion of the reaction chamber will consist substantially entirely of nickel and copper chlorides and gangue materials which may be present in the original ore.

When the ore is fed continuously during the course of a process, the admission of ore and chlorine may be discontinued when the presence of considerable ferric chloride in the issuing sulphur vapor indicates that insufficient fresh ore is being moved into the reaction zones to react with the ferric chloride produced, or when the operations have been conducted for a predetermined length of time.

When the ore is fed to the reaction chamber only until a predetermined amount has been admitted, the admission of chlorine may be discontinued when the last portion of the ore reaches the zone of maximum temperature. The process may be so conducted that satisfactory concentration will have been effected at that time.

In the case of continuous feeding, at the completion of the chlorination treatment, the iron-free material containing chlorides of copper and nickel will be segregated in the discharge end portion of the chamber, fresh or substantially unaltered ore will be present in the portion of the reaction chamber between the charging end and the zone of maximum temperature, and the ferrous chloride-bearing material will be concentrated in the intermediate portion of the reaction chamber.

Upon the completion of a chlorination process involving the admission of a predetermined amount or ore, the iron-free material will be segregated in the discharge end portion of the reaction chamber, and the ferrous chloride-bearing material will be concentrated in the adjoining portion of the chamber. The charging end portion of the chamber will be empty.

When the admission of chlorine has been discontinued the discharge end of the reaction chamber may be opened. Rotation of the reaction chamber will cause the contents to be discharged. The iron-free material containing chlorides of copper and nickel is discharged and collected first. While the iron-free material is being discharged the ferrous chloride concentrate is being moved toward the discharge end. After the iron-free material has been discharged and collected, the ferrous chloride concentrate is discharged and collected separately.

When the ferrous chloride concentrate has been discharged, treatment of a fresh batch of ore is commenced.

The ferrous chloride concentrate is subjected to the action of air at a temperature of 700° C. to 800° C. to recover chlorine. The treatment of the ferrous chloride concentrate is preferably so conducted that free chlorine is produced. The chlorine thus produced is utilized for treating the fresh batch of ore. Inert gases, such as nitrogen, which are introduced into the system during the treatment of the ferrous chloride concentrate with air are eliminated when the free sulphur produced is condensed.

A source of fresh chlorine is provided to compensate for losses due to leakage and the formation of nickel and copper chlorides.

The iron-free material may be treated in any suitable manner to recover the nickel and copper.

We claim:

1. The method of treating iron sulphide-bearing material which comprises, contacting a chlorinating agent with said material at temperatures which progressively increase as less chlorinated portions of the iron sulphide-bearing material come in contact with chlorinating agent.

2. The method of treating iron sulphide-bearing material which comprises, bringing a chlorinating agent in contact with said material at temperatures which progressively increase as less chlorinated portions of the material come in contact with chlorinating agent, said temperatures increasing from a point above the boiling temperature of ferric chloride to a point further above the boiling temperature of ferric chloride but below the boiling temperature of non-ferrous metal chlorides in the material.

3. The method of treating iron sulphide-bearing material which comprises, bringing a chlorinating agent in contact with said material at temperatures which progressively increase from approximately 300° C. to 550° C. as less chlorinated portions of the material come in contact with chlorinating agent.

4. The method of treating iron sulphide-bearing material which comprises, passing said material and a chlorinating agent through zones of different temperatures which progressively increase as less chlorinated portions of the ore are presented.

5. The method of treating iron sulphide-bearing material which comprises, passing said material and a chlorinating agent in countercurrent relationship through different temperature zones, the temperature of said zones progressively increasing from the point of first contact of the chlorinating agent with said material.

6. The method of treating iron sulphide-bearing material which comprises, chlorinating one portion of a batch of said material to convert the iron sulphide to ferric chloride, volatilizing said ferric chloride whereby a substantially iron-free product is obtained in one portion of said batch, and contacting said ferric chloride with another portion of said batch of material to chlorinate the same and obtain a concentrate of ferrous chloride.

7. The method of treating iron sulphide-bearing material which comprises, chlorinating one portion of a batch of said material to convert the iron sulphide to ferrous chloride, contacting the ferrous chloride so obtained with chlorine to form ferric chloride, volatilizing said ferric chloride whereby a product is obtained in one portion of said batch containing the non-ferrous metal compounds substantially free of iron, and contacting said ferric chloride with another portion of the batch of said material to chlorinate the same.

8. The method of treating iron sulphide-bearing material which comprises, chlorinating one portion of a batch of said material to convert the iron sulphide to ferric chloride, volatilizing said ferric chloride whereby a substantially iron-free product is obtained in one portion of said batch, and utilizing said ferric chloride to chlorinate another portion of said batch of material at a temperature below the boiling temperatures of chlorides of non-ferrous metals in the material whereby a concentrate of ferrous chloride is obtained.

9. The method of treating iron sulphide-bearing material which comprises, contacting one portion of a batch of said material with a chlorinating agent to convert the iron sulphide to ferrous chloride at a temperature below the boiling temperature of chlorides of non-ferrous metals in said material, contacting chlorine with the material so obtained to convert the ferrous chloride to ferric chloride, volatilizing said ferric chloride whereby a substantially iron-free product is obtained in said portion of the batch, and contacting said ferric chloride with another portion of said batch to chlorinate the same.

10. The method of treating iron sulphide-bearing material which comprises, passing said material through a reaction chamber in one direction, passing a chlorinating agent through said chamber in the opposite direction, maintaining such temperature at the point of first contact of said chlorinating agent with said material that the iron in the material is converted to ferric chloride and volatilized leaving a substantially iron-free residue, passing the mixture of chlorinating agent and ferric chloride in countercurrent flow with said material at a progressively increasing temperature whereby said material is chlorinated by said chlorinating agent and ferric chloride forming a concentrate of ferrous chloride, and restricting the maximum temperature to a point below that at which chlorides of the non-ferrous metal constituents of said material will volatilize.

11. The method of treating iron sulphide-bearing material which comprises, passing said material through a reaction chamber in one direction, passing a chlorinating agent through said chamber in the opposite direction, maintaining a temperature of not less than approximately 300° C. at the point of first contact of said chlorinating agent with said material, whereby the iron in the material is converted to ferric chloride and volatilized and a substantially iron-free residue is obtained, passing the mixture of chlorinating agent and ferric chloride in countercurrent flow with said material at a progressively increasing temperature whereby said material is chlorinated by the action of said chlorinating agent and ferric chloride forming a concentrate of ferrous chloride, and attaining a maximum temperature of not more than approximately 550° C.

In testimony whereof we affix our signatures.

RAYMOND F. BACON.
HENRY T. HOTCHKISS, Jr.